United States Patent
Ueno et al.

(10) Patent No.: US 12,344,689 B2
(45) Date of Patent: Jul. 1, 2025

(54) SHEET-SHAPED PHOTOCURABLE COMPOSITION, PHOTOCURABLE COMPOSITION SOLUTION, METHOD FOR PRODUCING SHEET-SHAPED PHOTOCURABLE COMPOSITION, AND LAMINATED BODY

(71) Applicant: THREEBOND CO., LTD., Tokyo (JP)

(72) Inventors: Kazuyuki Ueno, Tokyo (JP); Takashi Nemoto, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 0 days.

(21) Appl. No.: 17/539,783

(22) Filed: Dec. 1, 2021

(65) Prior Publication Data
US 2022/0185935 A1    Jun. 16, 2022

(30) Foreign Application Priority Data

Dec. 11, 2020   (JP) ................ 2020-205609

(51) Int. Cl.
| | |
|---|---|
| *C09J 151/00* | (2006.01) |
| *C08F 265/06* | (2006.01) |
| *C08J 5/18* | (2006.01) |
| *C09J 7/10* | (2018.01) |
| *C09J 7/40* | (2018.01) |

(52) U.S. Cl.
CPC .............. *C08F 265/06* (2013.01); *C08J 5/18* (2013.01); *C09J 7/10* (2018.01); *C09J 7/40* (2018.01); *C09J 151/006* (2013.01); *C08J 2351/00* (2013.01); *C08J 2353/00* (2013.01); *C09J 2451/00* (2013.01)

(58) Field of Classification Search
CPC .... C08F 220/58; C08F 265/06; C08F 287/00; C08F 290/067; C08K 5/20; C09J 2433/00; C09J 2451/00; C09J 151/006
See application file for complete search history.

(56) References Cited

U.S. PATENT DOCUMENTS

| | | | | |
|---|---|---|---|---|
| 2015/0062503 | A1* | 3/2015 | Yoon | .......................... C09J 7/22 |
| | | | | 428/355 R |
| 2020/0339798 | A1* | 10/2020 | Wolf | ...................... G03F 7/033 |

FOREIGN PATENT DOCUMENTS

| | | | |
|---|---|---|---|
| CN | 111201295 A | 5/2020 | |
| JP | 2017036368 A | 2/2017 | |
| TW | 201518455 A | 5/2015 | |
| WO | WO-2019073980 A1 * | 4/2019 | ............. B32B 27/00 |

OTHER PUBLICATIONS

Machine translation of WO-2019073980-A1, retrieved Feb. 25, 2023. (Year: 2019).*
Allnex, Ebecryl 230, 2013. (Year: 2013).*
Office Action issued for the related Taiwanese patent application No. 110144921, dated Feb. 17, 2025, with English translation, 22 pages.
Office Action issued on May 29, 2025 for the corresponding Taiwanese Patent Application No. 110144921, 12 pages, with English translation.

* cited by examiner

*Primary Examiner* — Callie E Shosho
*Assistant Examiner* — Krupa Shukla
(74) *Attorney, Agent, or Firm* — LUCAS & MERCANTI, LLP

(57) ABSTRACT

The sheet-shaped photocurable composition of the present invention includes components (A) to (D) as follows, and is in a sheet shape at 25° C. in a state before curing:
  Component (A): (meth)acrylic triblock copolymer,
  Component (B): (meth)acrylate oligomer (excluding the component (A)),
  Component (C): a monomer having a (meth)acryloyl group and having a specific structure, and
  Component (D): photoinitiator.

5 Claims, No Drawings

SHEET-SHAPED PHOTOCURABLE COMPOSITION, PHOTOCURABLE COMPOSITION SOLUTION, METHOD FOR PRODUCING SHEET-SHAPED PHOTOCURABLE COMPOSITION, AND LAMINATED BODY

CROSS-REFERENCE TO RELATED APPLICATION

The present application is based on Japanese Patent Application No. 2020-205609 filed on Dec. 11, 2020, the disclosure content of which is incorporated herein by reference in its entirety.

BACKGROUND

1. Technical Field

The present invention relates to a photocurable composition that is in a sheet shape at 25° C.

2. Description of Related Art

An adhesive used for assembling a display device such as an organic EL display is required to have good bonding property (adhesive property) over a wide temperature range. In order to improve such characteristics, it has been proposed to use a triblock copolymer elastomer having a hard segment which has a high glass transition temperature and a soft segment which has a low glass transition temperature in a photocurable composition.

For example, in JP 2017-036368 A, a photocurable pressure sensitive adhesive composition (adhesive composition) including a triblock copolymer elastomer of (meth)acrylate as a main component and having repeelability has been proposed. However, since the photocurable pressure sensitive adhesive composition disclosed in this literature is intended to be used as a pressure sensitive adhesive (that is, it can be re-peeled off, and when used, it is semi-solid and retains viscosity), it is unsuitable for use as a bonding agent (an adhesive agent which is used for adhesion to an adherend in a solid state without re-peeling). Specifically, the photocurable pressure sensitive adhesive composition disclosed in the above literature is often peeled off from an adherend (substrate) in a reliability test due to a decrease in strength or the like when left to stand in a high temperature atmosphere.

SUMMARY

As described above, according to the prior art, a photocurable composition using a triblock copolymer of (meth) acrylate used for optical applications has been proposed. However, peeling from the adherend (substrate) has been a problem in both normal temperature and high temperature environments (for example, under an atmosphere of 25° C. and under an atmosphere of 85° C.). When a (meth)acrylic resin plate, a polyethylene terephthalate (PET) film, or the like is used as an adherend (substrate), it is particularly difficult to improve the peel adhesive strength (adhesive strength) to the adherend (substrate).

The present invention has been made in view of the above circumstances, and an object of the present invention is to provide a means for improving the peel adhesive strength of a photocurable composition to a resin substrate, where it is difficult to improve the peel adhesive strength under both normal temperature and high temperature environments.

As a result of intensive studies to achieve the above object, the present inventors have found that according to a sheet-shaped photocurable composition to be described in detail below, the peel adhesive strength to a resin substrate, which is difficult to improve, can be improved at both normal temperature and a high temperature environment, and have completed the present invention.

In order to achieve at least one of the above objects, a sheet-shaped photocurable composition reflecting one aspect of the present invention includes the following components (A) to (D) and is in a sheet shape at 25° C. in a state before curing:

Component (A): (meth)acrylic triblock copolymer

Component (B): (meth)acrylate oligomer (excluding the component (A))

Component (C): compound represented by the following formula 1

[Formula 1]

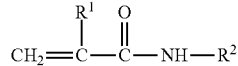

(In the above formula 1, $R^1$ is a hydrogen atom or a methyl group, and $R^2$ is a monovalent organic group including an oxygen atom)

Component (D): photoinitiator.

In addition, the present inventors have found that the above problems can be solved by the following photocurable composition solution, and have completed the present invention.

In order to achieve at least one of the above objects, a photocurable composition solution reflecting one aspect of the present invention includes the following components (A) to (D) and a solvent:

Component (A): (meth)acrylic triblock copolymer

Component (B): (meth)acrylate oligomer (excluding the component (A))

Component (C): compound represented by the above formula 1

Component (D): photoinitiator.

DETAILED DESCRIPTION

Hereinafter, embodiments of the present invention will be described. The present disclosure is not limited only to the following embodiments. In the present description, "X to Y" means a range including numerical values (X and Y) described before and after "to" as a lower limit value and an upper limit value, and means "X or more and Y or less". In addition, the concentration and % represent mass concentration and % by mass, respectively, unless otherwise specified, and the ratio is a mass ratio unless otherwise specified. In addition, unless otherwise specified, operations and measurements of physical properties and the like are performed under the conditions of a room temperature (20 to 25° C.) and a relative humidity of 40 to 55% RH. In addition, "A and/or B" means to include each of A and B and a combination thereof.

[Sheet-Shaped (Sheet-Type) Photocurable Composition]

A sheet-shaped (sheet-type) photocurable composition (hereinafter, also referred to as "sheet-shaped photocurable composition" or simply "composition") according to an aspect of the present invention includes the following components (A) to (D), and is in a sheet shape at 25° C. in a state before curing.

Component (A): (meth)acrylic triblock copolymer
Component (B): (meth)acrylate oligomer (excluding the component (A))
Component (C): compound represented by the following formula 1

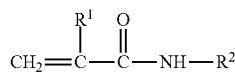

[Formula 1]

(In the above formula 1, $R^1$ is a hydrogen atom or a methyl group, and $R^2$ is a monovalent organic group including an oxygen atom)
Component (D): Photoinitiator.

According to the sheet-shaped photocurable composition according to an aspect of the present invention, the peel adhesive strength for a resin substrate such as a polyethylene terephthalate (PET) film, a (meth)acrylic resin plate, or a triacetyl cellulose (TAC) film can be improved from both normal temperature and high temperature environments (for example, under an atmosphere of 25° C. and under an atmosphere of 85° C.), that is, from a normal temperature environment of about 25° C. to a high temperature environment of about 85° C.

Conventionally, since the surfaces of these resin substrates are hydrophobic, it has been hard to perform bonding using a bonding agent (an adhesive agent), and the bonding property (adhesive property, the same hereinafter) of a composition including a triblock copolymer of (meth)acrylate for these resin substrates has not been sufficient.

In addition, when a triblock copolymer as described above (a triblock copolymer having a hard segment and a soft segment) is added to a composition for the purpose of obtaining a bonding agent (an adhesive agent) that can be used in a wide temperature range, there is also a problem that segments (blocks) having similar structures are aggregated to form a micro-phase separation structure, and the bonding property for a substrate is hardly improved.

However, according to the sheet-shaped photocurable composition according to the present invention, it is presumed that the compound included as the component (C) provides good bonding property even to a resin substrate with the peel adhesive strength that has conventionally been difficult to improve. Therefore, according to the sheet-shaped photocurable composition according to the present invention, good bonding property for a resin substrate can be obtained even when a triblock copolymer of (meth)acrylate is used. As a result, by using a triblock copolymer of (meth)acrylate, excellent bonding property can be obtained in a wide temperature range.

The above mechanism is based on presumption, and correctness or incorrectness of the mechanism does not affect the technical scope of the present invention.

The sheet-shaped photocurable composition according to the present invention is in a sheet shape at 25° C. in a state before curing. Herein, the "sheet-shaped" means a shape that spreads as a two-dimensional surface and has a front surface and a back surface facing each other with a distance corresponding to the thickness. The thickness is not particularly limited, and is, for example, preferably 5 to 300 μm, particularly preferably 10 to 200 μm. When the thickness of the sheet-shaped photocurable composition is within the above range, the solvent used in production is sufficiently volatilized, and generation of pinholes and voids can be effectively suppressed.

In the present description, a photocurable composition before being cured and formed into a sheet shape is referred to as a "sheet-shaped photocurable composition". In addition, a composition that is not processed into a sheet shape and is not yet cured is also simply referred to as a "photocurable composition". Furthermore, the "photocurable composition solution" refers to a solution further including a solvent in addition to the components included in the sheet-shaped photocurable composition. Furthermore, the "cured product" refers to a product obtained by polymerizing the sheet-shaped photocurable composition by light irradiation in a state without a solvent.

Hereinafter, the components included in the sheet-shaped photocurable composition according to one aspect of the present invention will be described.

<Component (A)>

The component (A) included in the sheet-shaped photocurable composition according to the present invention is a triblock copolymer of (meth)acrylate (in the present description, also referred to as a "(meth)acrylic triblock copolymer" or simply a "triblock copolymer"). In the present description, the "(meth)acrylate" refers to a compound having a (meth)acryloyl group. In addition, the term "(meth)acryloyl" encompasses both acryloyl and methacryloyl. Thus, for example, the term "(meth)acryloyl group" encompasses both an acryloyl group ($H_2C=CH—C(=O)—$) and a methacryloyl group ($H_2C=C(CH_3)—C(=O)—$). In addition, similarly, the term "(meth)acrylate" encompasses both acrylate and methacrylate, and the term "(meth)acrylic" encompasses both acrylic and methacrylic. The (meth)acryloyl group may be included in the component as a form of a (meth)acryloyloxy group.

The triblock copolymer of (meth)acrylate as the component (A) is a triblock copolymer obtained or obtainable by polymerizing a (meth)acrylate monomer (ester compound having one or more (meth)acryloyl groups). By including the component (A), the sheet-shaped photocurable composition according to the present invention is excellent in peel adhesive strength at normal temperature and high temperature environments (for example, under an atmosphere of 25° C. and under an atmosphere of 85° C.). In addition, the triblock copolymer of a (meth)acrylate has good compatibility with a (meth)acrylate oligomer, and especially with the component (B), which will be described in detail below. As described above, when compatibility with the component (B) is good, transparency is improved, and a sheet-shaped photocurable composition suitable for display elements and optical applications is obtained.

The component (A) is preferably an elastomer including no reactive functional group. The tensile elongation of the component (A) is preferably 100 to 600%, more preferably 110 to 580%, and particularly preferably 130 to 400%. When the tensile elongation is 100% or more, the flexibility of the sheet-shaped photocurable composition is improved, and excellent bonding property can be exhibited for surfaces having various shapes due to easy followability to uneven surfaces, curved surfaces, or the like. Whereas, when the tensile elongation is 600% or less, the sheet-shaped photocurable composition is not too soft, workability is improved, and excellent peel adhesive strength is obtained. In addition, it becomes easier to form the photocurable composition into a sheet form. The above tensile elongation is a value measured in accordance with ISO 37:2017.

As the triblock copolymer as the component (A), it is possible to use a triblock copolymer such as an X-Y-Z type composed of the segment X, the segment Y, and the segment Z (a structure having three units of types different from each other), and an X-Y-X type composed of the segment X and the segment Y (a structure in which one unit of a different type is sandwiched between two units of the same type). Each of the segments may be composed of a single monomer or two or more of monomers. The method for producing such a triblock copolymer is not particularly limited, and examples thereof include a method of living polymerization of a known (meth)acrylate monomer constituting each segment (block). Examples of the living polymerization method include a method of anionic polymerization using an organic alkali metal compound as a polymerization initiator and a method of polymerization using an organic rare earth metal complex as a polymerization initiator. In addition, it is possible to polymerize a known (meth)acrylate monomer constituting each segment (block) by using a polyvalent radical polymerization initiator or a polyvalent radical chain transfer agent.

Of these, the triblock copolymer as the component (A) is preferably X-Y-X type. By using the component (A) having such a structure, the peel adhesive strength at room temperature and high temperature environments is further improved, and the compatibility with the component (B) described in detail below becomes good, and therefore the transparency also becomes good.

Furthermore, the triblock copolymer as the component (A) is preferably a triblock copolymer of X-Y-X type or the like composed of a hard segment X having a high glass transition temperature and a soft segment Y having a low glass transition temperature. Herein, the "glass transition temperature" means the glass transition temperature (Tg) of the polymer of the monomer constituting the segment. In the present description, as the value of the glass transition temperature (Tg), there is adopted the value of the intermediate point glass transition temperature determined by performing thermal analysis of the polymer at a temperature rising rate of 20° C./min in accordance with JIS K 7121: 1987.

The glass transition temperature of the segment X is preferably 80 to 250° C., more preferably 90 to 200° C., and particularly preferably 100 to 150° C. When the glass transition temperature of the segment X is within the above range, the bonding strength is excellent when cured.

The glass transition temperature of the segment Y is preferably −150 to 0° C., more preferably −100 to −15° C., and particularly preferably −70 to −30° C. When the glass transition temperature of the segment Y is in the above range, the peel adhesive strength for a resin substrate such as a PET film, which is hard to improve the bonding strength, is further improved in room temperature and high temperature environments.

The component (A) is preferably a triblock copolymer of (meth)acrylate of an X-Y-X type composed of the segment X with a glass transition temperature of 100 to 150° C. and the segment Y with a glass transition temperature of −70 to −30° C. Furthermore, the component (A) is preferably a triblock copolymer of (meth)acrylate of an X-Y-X type composed of the segment X and the segment Y each having a glass transition temperature in the above preferable range. By using such a triblock copolymer, the desired peel adhesive strength is further improved.

The monomer constituting the segment X is preferably methacrylate having a linear or branched alkyl group having 1 to 5 carbon atoms, more preferably methacrylate having a linear or branched alkyl group having 1 to 3 carbon atoms, and particularly preferably methyl methacrylate. That is, the component (A) is preferably a triblock copolymer composed of a PMMA (polymethyl methacrylate) block and a (other) block other than PMMA. By using the triblock copolymer having such a structure, the desired peel adhesive strength is further improved.

In addition, the monomer constituting the segment Y is preferably an acrylate having a linear or branched alkyl group having 1 to 20 carbon atoms, more preferably an acrylate having a linear or branched alkyl group having 2 to 15 carbon atoms, still more preferably an acrylate having a linear or branched alkyl group having 3 to 8 carbon atoms, and particularly preferably n-butyl acrylate. That is, the component (A) preferably includes a PnBA (poly-n-butyl acrylate) block. By using the triblock copolymer having such a structure, the desired peel adhesive strength is further improved.

According to a preferable embodiment of the present invention, the segment X of the component (A) is preferably a polymer of methacrylate having an alkyl group having 1 to 3 carbon atoms, and the segment Y is preferably a polymer of acrylate having an alkyl group having 3 to 8 carbon atoms. By using the triblock copolymer having such a structure, the desired peel adhesive strength is further improved. Furthermore, the component (A) is more preferably a triblock copolymer of (meth)acrylate of X-Y-X type in which the segment X is a PMMA block and the segment Y is a PnBA block.

In the component (A), the content ratio of the segment X when the total amount of the triblock copolymer is 100% by mass is preferably 5% by mass or more, more preferably 15% by mass or more, and particularly preferably 25% by mass or more. Whereas, the upper limit thereof is preferably 60% by mass or less, more preferably 50% by mass or less, and particularly preferably 45% by mass or less. And in this case, the segment X is preferably a PMMA block. With such a configuration, the tensile elongation of the component (A) is easy to be 100% or more, and therefore the flexibility of the sheet-shaped photocurable composition is improved. As a result, the sheet-shaped photocurable composition easily follows an uneven surface, a curved surface, or the like, and therefore excellent bonding property can be exhibited for surfaces having various shapes.

Whereas, in the component (A), the content ratio of the segment Y when the total amount of the triblock copolymer is 100% by mass is preferably 40% by mass or more, more preferably 50% by mass or more, and particularly preferably 55% by mass or more. Whereas, the upper limit thereof is preferably 95% by mass or less, more preferably 85% by mass or less, and particularly preferably 75% by mass or less. When the content ratio of each segment is within the above range, the desired peel adhesive strength is further improved.

Furthermore, in the component (A), when the total amount of the triblock copolymer is 100% by mass, the content ratio of the segment X is preferably 5 to 60% by mass, and the content ratio of the segment Y is preferably 40 to 95% by mass. In this form, it is preferable that the content ratios of the segment X and the segment Y are each within any of the above preferable ranges.

The weight average molecular weight (Mw) of the component (A) is not particularly limited, and is preferably 10,000 to 500,000, more preferably 30,000 to 200,000, still more preferably 40,000 to 150,000, and particularly preferably 50,000 to 100,000. When the weight average molecular weight is 10,000 or more, curability is further improved. In addition, when the weight average molecular weight is 500,000 or less, the viscosity is lower, and conformability at the interface when bonding to an adherend is further improved, and as a result, the desired peel adhesive strength is further improved. In the present description, the weight average molecular weight is a weight average molecular weight in terms of polystyrene measured by GPC (gel permeation chromatography).

As the component (A), either a synthetic product or a commercially available product can be used.

Specific examples of commercially available products of the component (A) include KURARITY (registered trademark, the same applies hereinafter) LA series manufactured by KURARAY CO., LTD., using methyl methacrylate and n-butyl acrylate, and KURARITY LK series using methyl methacrylate, n-butyl acrylate, and 2-ethylhexyl acrylate. Specific examples thereof include KURARITY LA2270, LA2250, LA2140, LA2330, and LA3320 manufactured by KURARAY CO., LTD.; however, are not limited thereto.

The component (A) may be used singly or in combination of two or more. When two or more are used in combination, the content of the component (A) refers to the total amount.

The content of the component (A) is not particularly limited, and is preferably 40 to 90 parts by mass, more preferably 50 to 80 parts by mass, and particularly preferably 60 to 70 parts by mass, relative to 100 parts by mass of the total of the components (A) to (D). When the content of the component (A) is within the above range, the desired peel adhesive strength is further improved.

In addition, the content of the component (A) is preferably 40 to 90% by mass, more preferably 50 to 80% by mass, and particularly preferably 60 to 70% by mass, relative to the total mass of the sheet-shaped photocurable composition (in a condition of excluding volatile components such as a solvent).

<Component (B)>

The component (B) included in the sheet-shaped photocurable composition according to the present invention is a (meth)acrylate oligomer (excluding the component (A)). The (meth)acrylate oligomer refers to an oligomer having one or more (meth)acryloyl groups. In addition, the term "oligomer" refers to a polymer in which monomer units (including monomer units other than (meth)acrylate monomers) are repeated about 2 to several tens of times. A polymer having three segments (blocks) composed of a constituent unit derived from a (meth)acrylate monomer is included in the component (A) and is not included in the component (B).

The component (B) preferably has 2 to 5 (meth)acryloyl groups per one molecule (bi- to penta-functional (meth)acrylate oligomers) and more preferably has 2 (meth)acryloyl groups per molecule (bifunctional (meth)acrylate oligomer). In addition, the (meth)acryloyl group included in the component (B) is preferably an acryloyl group.

The weight average molecular weight of the component (B) is preferably 1,000 to 50,000, more preferably 1,000 to 30,000, still more preferably 3,000 to 10,000, and particularly preferably 4,000 or more and less than 10,000. When the weight average molecular weight is 1000 or more, curability is good, and when the weight average molecular weight is 50,000 or less, viscosity is lower, and conformability at an interface is good when bonding to an adherend, and as a result, the desired peel adhesive strength is improved.

In addition, the glass transition temperature of the component (B) is preferably 25° C. or less, more preferably 0° C. or less, and particularly preferably −30° C. or less. By setting the glass transition temperature of the component (B) within the above range, it is possible to contribute to improvement of the peel adhesive strength. Whereas, the lower limit thereof is not particularly limited, and is preferably −100° C. or more.

Examples of the component (B) include an epoxy-modified (meth)acrylate oligomer, a urethane-modified (meth)acrylate oligomer, and an oligomer having a main skeleton obtained by polymerizing a (meth)acrylic monomer and having a (meth)acryloyl group at a terminal of the main skeleton. Of these, the component (B) is preferably a urethane-modified (meth)acrylate oligomer because it has good adhesion to glass or plastic used for a protective panel.

Examples of the epoxy-modified (meth)acrylate oligomer include epoxy-modified (meth)acrylic oligomers obtained by adding (meth)acrylic acid to a bisphenol A type epoxy resin, a bisphenol F type epoxy resin, a phenol novolac resin, or the like; however, are not limited thereto.

In the present description, the urethane-modified (meth)acrylate oligomer refers to an oligomer having one or more urethane bonds and one or more (meth)acryloyl groups. Regarding the urethane-modified (meth)acrylate oligomer, the preferable number of (meth)acryloyl groups included per molecule and the weight average molecular weight are the same as those described for the above (meth)acrylate oligomer.

As the component (B), either a synthetic product or a commercially available product can be used. A urethane-modified (meth)acrylate oligomer that is a preferable form as the component (B) is synthesized by a reaction of, for example, a polyol compound (main skeleton) having two or more hydroxyl groups in the molecule, a compound having two or more isocyanate groups in the molecule, and a (meth)acrylate having one or more hydroxyl groups in the molecule.

Examples of the polyol compound having two or more hydroxyl groups in the molecule include polyether polyol, polyester polyol, caprolactone diol, bisphenol polyol, polyisoprene polyol, hydrogenated polyisoprene polyol, polybutadiene polyol, hydrogenated polybutadiene polyol, castor oil polyol, and polycarbonate diol. Of these, polycarbonate diol, polybutadiene polyol, and hydrogenated polybutadiene polyol are preferable from the viewpoint of excellent transparency and excellent durability, and polycarbonate diol is particularly preferable from the viewpoint that the cured product is hardly clouded in a high-temperature and high-humidity atmosphere. These may be used singly or in combination of two or more.

Examples of the compound having two or more isocyanate groups in the molecule include aromatic polyisocyanates, alicyclic polyisocyanates, and aliphatic polyisocyanates, and of these, aliphatic polyisocyanates and alicyclic polyisocyanates are preferable from the viewpoint of enabling obtaining a flexible cured product. These may be used singly or in combination of two or more. From the viewpoint of improving the desired peel adhesive strength, the component (B) is preferably an aliphatic urethane-modified (meth)acrylate oligomer synthesized by using an aliphatic polyisocyanate.

Examples of the aromatic polyisocyanate include 2,4-tolylene diisocyanate, 2,6-tolylene diisocyanate, 1,3-xylylene diisocyanate, 1,4-xylylene diisocyanate, tetramethylxylylene diisocyanate, diphenylmethane diisocyanate, naphthalene-1,5-disocyanate, and triphenylmethane triisocyanate. Examples of the alicyclic polyisocyanate include isophorone diisocyanate, bis(4-isocyanatocyclohexyl)methane, 1,3-bis(isocyanatomethyl)cyclohexane, 1,4-bis(isocyanatomethyl)cyclohexane, norbornane diisocyanate, and bicycloheptane triisocyanate. Examples of the aliphatic polyisocyanate include hexamethylene diisocyanate, 1,3,6-hexamethylene triisocyanate, and 1,6,11-undecatriisocyanate. Of these, alicyclic or aliphatic diisocyanates such as isophorone diisocyanate and hexamethylene diisocyanate are preferable, and aliphatic diisocyanates are particularly preferable.

Examples of the (meth)acrylate containing one or more hydroxyl groups in the molecule include mono(meth)acrylates of dihydric alcohols such as ethylene glycol, propylene glycol, 1,3-propanediol, 1,3-butanediol, 1,4-butanediol, and polyethylene glycol; and mono(meth)acrylate or di(meth)acrylate of trihydric alcohol such as trimethylolethane, trimethylolpropane, and glycerin. Of these, mono(meth)acrylate of dihydric alcohol is preferable, and mono(meth)acrylate of ethylene glycol is more preferable from the viewpoint of enabling obtaining a cured product that is excellent in flexibility. These may be used singly or in combination of two or more.

The method for synthesizing the urethane-modified (meth)acrylate oligomer is not particularly limited, and a known method can be used. The urethane-modified (meth)acrylate oligomer can be synthesized, for example, by a reaction with each of the above compounds as a raw material, and more specifically, can be synthesized by the following method.

A polyol compound having two or more hydroxyl groups in the molecule and an isocyanate compound having two or more isocyanate groups in the molecule are reacted in a diluent (for example, methyl ethyl ketone, methoxyphenol, and the like), preferably in a molar ratio of 3:1 to 1:3 (polyol compound:isocyanate compound), more preferably in a molar ratio of 2:1 to 1:2, to provide a urethane prepolymer. Then, the isocyanate group remaining in the obtained urethane prepolymer is further reacted with a (meth)acrylate containing one or more hydroxyl groups in the molecule in an amount sufficient to react with the isocyanate group to synthesize a urethane-modified (meth)acrylate oligomer.

Examples of the catalyst used in synthesis include lead oleate, tetrabutyltin, antimony trichloride, triphenylaluminum, trioctylaluminum, dibutyltin dilaurate, copper naphthenate, zinc naphthenate, zinc octylate, zinc octenate, zirconium naphthenate, cobalt naphthenate, tetra-n-butyl-1,3-diacetyloxydistannoxane, triethylamine, 1,4-diaza [2,2,2] bicyclooctane, and N-ethylmorpholine. Of these, dibutyltin dilaurate, zinc naphthenate, zinc octylate, and zinc octenate are preferably used because a cured product of which activity is high and transparency is excellent can be obtained. It is preferable to use 0.0001 to 10 parts by mass of these catalysts relative to 100 parts by mass of the total amount of the reactants. In addition, the reaction temperature is typically 10 to 100° C., and particularly preferably 30 to 90° C. As the urethane-modified (meth)acrylate oligomer, one diluted with a solvent or a monomer having a (meth)acryloyl group described later at a raw material stage may be used.

Specific examples of commercially available products of the component (B) include UN-1255, UN-9200A, UN-9000PEP and the like manufactured by Negami Chemical Industrial Co., Ltd., U-200PA, UA-160TM and the like manufactured by Shin-Nakamura Chemical Co., Ltd., SHI-KOH series UV-3000B, UV-3700B and the like manufactured by Mitsubishi Chemical Corporation, TEAI-1000 manufactured by Nippon Soda Co., Ltd., EBECRYL (registered trademark) series 230, 270, 4858, 8402, 8804, 8807, 9270, 4513, 8311, 9260, 8701, 4265, 4587, 8210, 1290, 5129, 8310R, 210, 220 and the like manufactured by Daicel-Allnex Ltd.; however, are not limited thereto.

The component (B) may be used singly or in combination of two or more. When two or more are used in combination, the content of the component (B) refers to the total amount.

The content of the component (B) is not particularly limited, and is preferably 10 to 80 parts by mass, more preferably 20 to 60 parts by mass, and particularly preferably 30 to 50 parts by mass, relative to 100 parts by mass of the component (A). When the content of the component (B) relative to 100 parts by mass of the component (A) is 10 parts by mass or more, the peel adhesive strength can be improved in both normal temperature and high temperature environments (under an atmosphere of 25° C. and an atmosphere of 85° C.), and whereas, when the content of the (B) component is 80 parts by mass or less, the flow starting temperature during lamination can be lowered, and thermal damage to the adherend can be reduced.

<Component (C)>

The component (C) included in the sheet-shaped photocurable composition according to the present invention is a compound represented by the following formula 1. The compound represented by the following formula 1 is a monomer having a (meth)acryloyl group and is a (meth)acrylamide monomer. By including such a component (C), the sheet-shaped photocurable composition according to the present invention has excellent bonding property for a resin substrate while including a triblock copolymer of (meth)acrylate (component (A)).

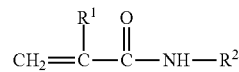

[Formula 1]

In the formula 1, $R^1$ is a hydrogen atom or a methyl group, and $R^2$ is a monovalent organic group including an oxygen atom. Specific examples of the monovalent organic group including an oxygen atom include a monovalent organic group having a hydroxyl group and/or an ether bond; however, are not limited thereto. When $R^2$ includes an ether bond, the ether bond is preferably included as an alkoxy group. That is, $R^2$ preferably includes a hydroxyl group and/or an alkoxy group.

From the viewpoint of promoting curing by light irradiation, $R^1$ in the above formula 1 is preferably a hydrogen atom. That is, the component (C) is preferably an acrylamide compound. In a more preferable embodiment, in the compound as the component (C), in the formula 1, $R^1$ is a hydrogen atom, and $R^2$ includes a hydroxyl group and/or an ether bond. In addition, $R^2$ more preferably includes a hydroxyl group and/or an alkoxy group.

Furthermore, $R^2$ in the formula 1 is preferably a monovalent organic group represented by the following formula 2.

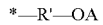  [Formula 2]

In the formula 2, $R^1$ is a linear or branched alkylene group having 1 to 5 carbon atoms, A is a hydrogen atom or a linear or branched alkyl group having 1 to 5 carbon atoms, and "*" is a point of bonding to a nitrogen atom in the formula 1

Examples of the linear or branched alkylene group having 1 to 5 carbon atoms as $R'$ include a methylene group, an ethylene group, a trimethylene group, a propylene group, an n-butylene group, a 1-methylpropylene group, a 2-methylpropylene group, a dimethylethylene group, and an ethylethylene group.

Examples of the linear or branched alkyl group having 1 to 5 carbon atoms as A include a methyl group, an ethyl group, a propyl group, an isopropyl group, a n-butyl group, an isobutyl group, a sec-butyl group, a tert-butyl group, a pentyl group, an isopentyl group, a tert-pentyl group, and a neopentyl group.

More preferably, the component (C) is a compound in which in the formula 1, $R^1$ is a hydrogen atom, $R^2$ is a monovalent organic group represented by the formula 2, and in the formula 2, R' is a linear or branched alkylene group having 1 to 3 carbon atoms, and A is a hydrogen atom or a linear alkyl group having 2 to 5 carbon atoms. Furthermore, in the above embodiment, A is particularly preferably a hydrogen atom.

Specific examples of the component (C) include hydroxyethyl (meth)acrylamide and N-n-butoxymethyl (meth)acrylamide. These may be used singly or in combination of two or more.

Specific examples of commercially available products of the component (C) include HEAA (registered trademark) manufactured by KJ Chemicals Corporation and NBMA manufactured by Shimyo Corporation; however, are not limited thereto.

The component (C) may be used singly or in combination of two or more. When two or more are used in combination, the content of the component (C) refers to the total amount.

The content of the component (C) is not particularly limited, and is preferably 0.1 to 30 parts by mass, more preferably 0.1 to 10 parts by mass, still more preferably 1 to 9 parts by mass, particularly preferably 3 to 8 parts by mass, and most preferably 5 to 8 parts by mass relative to 100 parts by mass of the component (A). When the content of the component (C) relative to 100 parts by mass of the component (A) is 0.1 parts by mass or more, the bonding property is further improved, and the peel adhesive strength for a resin substrate such as a (meth)acrylic resin plate, a TAC film, or a PET film can be further improved. Whereas, when the content of the component (C) is 30 parts by mass or less, the flow starting temperature can be lowered, and thermal damage to the adherend can be reduced.

In addition, the content of the component (C) is preferably 1 to 50 parts by mass, more preferably 5 to 30 parts by mass, still more preferably 10 to 20 parts by mass, and particularly preferably 12 to 18 parts by mass, with respect to 100 parts by mass of the component (B). When the content of the component (C) relative to 100 parts by mass of the component (B) is 1 part by mass or more, the bonding property is further improved, and the peel adhesive strength for a resin substrate can be further improved. Whereas, when the content of the component (C) is 50 parts by mass or less, the flow starting temperature can be lowered, and thermal damage to the adherend can be reduced.

<Component (D)>

The component (D) included in the sheet-shaped photocurable composition according to the present invention is a photoinitiator (photopolymerization initiator). The photoinitiator is a compound which is decomposed by irradiation with active energy rays such as ultraviolet rays, visible light, and electron beams to generate radical species, cationic species, or anionic species.

Examples of the component (D) include an acetophenone-based photoinitiator, a benzoin-based photoinitiator, a benzophenone-based photoinitiator, a thioxanthone-based photoinitiator, and an acylphosphine oxide-based photoinitiator. These may be used singly or may be used in combination of two or more. Of these, the component (D) preferably includes an acylphosphine oxide-based photoinitiator. A composition including the acylphosphine oxide photoinitiator may be yellow in itself; however, is easily cured by active energy rays in the visible light region, and thus photocurability is improved.

Examples of the acetophenone-based photoinitiator include diethoxyacetophenone, 2-hydroxy-2-methyl-1-phenylpropane-1-one, benzyl dimethyl ketal, 4-(2-hydroxyethoxy)phenyl-(2-hydroxy-2 propyl)ketone, 1-hydroxycyclohexyl phenyl ketone, 2-methyl-2-morpholino (4-thiomethylphenyl)propane-1-one, 2-benzyl-2-dimethylamino-1-(4-morpholinophenyl)butanone, and 2-hydroxy-2-methyl-1-[4-(1-methylvinyl)phenyl]propanone oligomer; however, are not limited thereto.

Examples of the benzoin-based photoinitiator include benzoin, benzoin methyl ether, benzoin ethyl ether, benzoin isopropyl ether, and benzoin isobutyl ether; however, are not limited thereto.

Examples of the benzophenone-based photoinitiator include benzophenone, methyl o-benzoylbenzoate, 4-phenylbenzophenone, 4-benzoyl-4'-methyldiphenylsulfide, 3,3',4,4'-tetra(tert-butylperoxycarbonyl)benzophenone, 2,4,6-trimethylbenzophenone, 4-benzoyl-N,N-dimethyl-N-[2-(1-oxo-2-propenyloxy)ethyl]benzenemethanaminium bromide, and (4-benzoylbenzyl)trimethylammonium chloride; however, are not limited thereto.

Examples of the thioxanthone-based photoinitiator include 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-one mesochloride; however, are not limited thereto.

Examples of the acylphosphine oxide-based photoinitiator include bis(2,4,6-trimethylbenzoyl)-phenylphosphine oxide, 2,4,6-trimethylbenzoyl-diphenyl-phosphine oxide, and 2,4,6-trimethylbenzoyl-phenylethoxy-phosphine oxide; however, are not limited thereto.

Specific examples of commercially available products of the component (D) include OMNIRAD (registered trademark) series TPO manufactured by IGM Resins B.V. corporation; however, are not limited thereto.

The component (D) may be used singly or in combination of two or more. When two or more are used in combination, the content of the component (D) refers to the total amount.

The content (additional amount) of the component (D) is not particularly limited, and is preferably 0.1 to 5.0 parts by mass, more preferably 0.1 to 3.0 parts by mass, and particularly preferably 0.3 to 1.0 parts by mass relative to 100 parts by mass of the component (A). When the content of the component (D) relative to 100 parts by mass of the component (A) is 0.1 parts by mass or more, a photocurable composition having excellent photocurability can be obtained, and when the content is 5.0 parts by mass or less, coloring of a cured product can be effectively prevented.

In addition, the content (additional amount) of the component (D) is preferably 0.1 to 5.0 parts by mass and more preferably 0.5 to 3.0 parts by mass relative to 100 parts by mass of the component (B). In addition, in another preferable embodiment, the content (additional amount) of the component (D) relative to 100 parts by mass of the component (B) is 0.1 to 1.0 parts by mass. When the content of the component (D) relative to 100 parts by mass of the component (B) is 0.1 parts by mass or more, a photocurable composition having excellent photocurability can be obtained, and when the content is 5.0 parts by mass or less, coloring of a cured product can be effectively prevented.

<Component (E)>

The sheet-shaped photocurable composition according to the present invention preferably further includes a coupling agent as a component (E) in addition to the components (A) to (D) from the viewpoint of improving the bonding force at the interface.

As the component (E) that can be included in the sheet-shaped photocurable composition according to the present invention, a silane coupling agent having an alkoxysilyl group is preferable.

Specific examples of the silane coupling agent having an alkoxysilyl group include: glycidyl group-containing silane coupling agents such as 2-(3,4-epoxycyclohexyl)ethyltrimethoxysilane, 3-glycidoxypropyltriethoxysilane, 3-glycidoxypropylmethyldimethoxysilane, 3-glycidoxypropyltrimethoxysilane, and 3-glycidoxypropylmethyldiethoxysilane; vinyl group-containing silane coupling agents such as vinyltris(β-methoxyethoxy)silane, vinyltriethoxysilane, and vinyltrimethoxysilane; (meth)acryloyl group-containing silane coupling agents such as 3-methacryloyloxypropyltrimethoxysilane (γ-methacryloyloxypropyltrimethoxysilane); amino group-containing silane coupling agents such as N-β-(aminoethyl)-γ-aminopropyltrimethoxysilane, γ-aminopropyltriethoxysilane, and N-phenyl-γ-aminopropyltrimethoxysilane; and others such as γ-mercaptopropyltrimethoxysilane and γ-chloropropyltrimethoxysilane. These may be used singly or may be used in combination of two or more. Of these, a silane coupling agent containing an epoxy group (glycidyl group) or a (meth)acryloyl group in addition to an alkoxysilyl group is preferable, and a silane coupling agent containing a methacryloyl group is most preferable from the viewpoint that the adhesion to a resin substrate can be expected to be further improved.

The component (E) may be used singly or in combination of two or more. When two or more are used in combination, the content of the component (E) refers to the total amount.

The content (additional amount) of the component (E) is not particularly limited, and is preferably 0.05 to 15 parts by mass, more preferably 0.5 to 10 parts by mass, and particularly preferably 0.8 to 5 parts by mass relative to 100 parts by mass of the component (A). When the content of the component (E) relative to 100 parts by mass of the component (A) is 0.05 parts by mass or more, it contributes to further improvement of peel adhesive strength, and when the content is 15 parts by mass or less, an effect of reducing outgas can be obtained.

In addition, the addition amount of the component (E) is preferably 0.1 to 20 parts by mass and more preferably 3 to 15 parts by mass relative to 100 parts by mass of the component (B). When the content of the component (E) relative to 100 parts by mass of the component (B) is 0.1 parts by mass or more, it contributes to further improvement of peel adhesive strength, and when the content is 20 parts by mass or less, an effect of reducing outgas can be obtained.

<Optional Component>

The sheet-shaped photocurable composition according to the present invention may further include additives such as a solvent, a monomer having a (meth)acryloyl group other than the component (C), a filler such as an inorganic filler and an organic filler, a storage stabilizer, an antioxidant, a light stabilizer, an ultraviolet absorber, a plasticizer, a dye, a pigment, a flame retardant, a sensitizer, a heat initiator, a heavy metal inert agent, an ion trapping agent, an emulsifier, a water dispersion stabilizer, an antifoaming agent, a release agent, a leveling agent, a wax, a rheology control agent, and a surfactant, as long as the object of the present invention is not impaired.

(Monomer Having (Meth)Acryloyl Group Other than Component (C))

Examples of the monomer having a (meth)acryloyl group other than the component (C) include monofunctional, bifunctional, trifunctional, tetrafunctional or higher polyfunctional monomers. A (meth)acrylate monomer is preferable, and a monofunctional or bifunctional (meth)acrylate monomer is particularly preferable. In order to reduce the viscosity of the photocurable composition, for the monomer having a (meth)acryloyl group other than the component (C), the molecular weight is preferably 1000 or less. The molecular weight of such a compound (low molecular weight compound) can be measured by a known method such as a gas chromatography-mass spectrometry (GC-MS) method.

Examples of the monofunctional monomer include lauryl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, benzyl (meth)acrylate, phenyl (meth)acrylate, phenoxyethyl (meth)acrylate, phenoxydiethylene glycol (meth)acrylate, phenoxytetraethylene glycol (meth)acrylate, nonylphenoxyethyl (meth)acrylate, butoxyethyl (meth)acrylate, 2-hydroxyethyl (meth)acrylate, 2-hydroxypropyl (meth)acrylate, glycerol (meth)acrylate, modified butyl (meth)acrylate, epichlorohydrin-modified phenoxy (meth)acrylate, N,N-dimethylaminoethyl (meth)acrylate, and N, N-diethylaminoethyl (meth)acrylate, and morpholino (meth)acrylate.

Examples of the bifunctional monomer include neopentyl glycol di(meth)acrylate, bisphenol A di(meth)acrylate, epichlorohydrin-modified bisphenol A di(meth)acrylate, stearic acid-modified pentaerythritol di(meth)acrylate, dicyclopentenyl diacrylate, and di(meth)acryloyl isocyanurate.

Examples of the trifunctional monomer include trimethylolpropane tri(meth)acrylate, pentaerythritol tri(meth)acrylate, epichlorohydrin-modified trimethylolpropane tri(meth)acrylate, epichlorohydrin-modified glycerol tri(meth)acrylate, and tris(acryloyloxyethyl)isocyanurate.

Examples of the polyfunctional monomer include ditrimethylolpropane tetra(meth)acrylate, pentaerythritol tetra(meth)acrylate, dipentaerythritol monohydroxy penta(meth)acrylate, alkyl-modified dipentaerythritol pentaacrylate, and dipentaerythritol hexa(meth)acrylate. These polymerizable monomers can be used singly or in combination of two or more.

In another preferable embodiment, the monomer having a (meth)acryloyl group other than the component (C) is a (meth)acrylate containing one or more ether bonds and one or more (meth)acryloyl groups. As the (meth)acrylate, a polyether monomer (polyether (meth)acrylate) having 8 to 30 repeating structures of ether bonds in one molecule is preferable. When the number of the repeating structure of the ether bond is 8 or more, cloudiness caused by separation between moisture permeating from the outside into the cured product under a high-temperature and high-humidity atmosphere and the polyether monomer is further suppressed. Whereas, for the polyether monomer in which the number of the repeating structure of an ether bond is 30 or less, the monomers are hardly crystallized, and cloudiness of the cured product is further suppressed. These may be used singly or in combination of two or more.

Examples of the (meth)acrylate (polyether (meth)acrylate) containing an ether bond and a (meth)acryloyl group include polyethylene glycol mono(meth)acrylate, polyethylene glycol di(meth)acrylate, polypropylene glycol mono(meth)acrylate, polypropylene glycol di(meth)acrylate, polyoxytetramethylene glycol mono(meth)acrylate, and polyoxytetramethylene glycol di(meth)acrylate.

The molecular weight of the polyether (meth)acrylate is preferably in the range of 200 to 5,000, more preferably 250 to 3,000.

Specific examples of commercially available products of the polyether (meth)acrylate include M-90G, AM-130G, M-230G, A-400, A-600, APG-700, A-1000, 9G, 14G, 23G, and 1206 PE manufactured by Shin-Nakamura Chemical Co., Ltd., PDE-600, PDP-700, and ADE-600 manufactured by NOF CORPORATION, and light ester series 130MA, 130A, 14EG, and 14EG-A manufactured by Kyoeisha Chemical Co., Ltd.; however, are not limited thereto.

(Inorganic Filler)

Specific examples of the inorganic filler include glass powder, fumed silica powder, silica powder, alumina powder, mica powder, silicone rubber powder, calcium carbonate powder, aluminum nitride powder, carbon powder, kaolin clay powder, dry clay mineral powder, dry diatomaceous earth powder, and metal powder. Furthermore, examples of the fumed silica powder include those whose surfaces have been chemically modified (hydrophobized) with organochlorosilanes, polyorganosiloxanes, hexamethyldisilazane, or the like; however, are not limited thereto. Specific examples of commercially available products of the inorganic filler include AEROSIL (registered trademark) series R974, R972, R972V, R972CF, R805, R812, R812S, R816, R8200, RY200, RX200, RY200S, and R202 manufactured by Nippon Aerosil Co., Ltd. For the purpose of improving fluidity or the like and improving the mechanical strength of the cured product, the content (blending amount) of the inorganic filler is preferably about 0.1 to 100 parts by mass relative to 100 parts by mass of the total of the components (A) to (D).

(Ultraviolet Absorber)

Examples of the ultraviolet absorber include 2-(5-chloro-2-benzotriazolyl)-6-tert-butyl-p-cresol, 2-(2'-hydroxy-5'-tert-octylphenyflbenzotriazole, 2-(2'-hydroxy-3'-tert-butyl-5'-methylphenyl)-5-chlorobenzotriazole, 2-(3,5-di-tert-amyl-2-hydroxyphenyl)benzotriazole, tetrakis(1,2,2,2,6,6-pentamethylpiperidine-4-yl)1,2,3,4-butanetetracarboxylate, bis(2,2,6,6-tetramethyl-4-piperidyl)sebacate, and bis(1,2,2,6,6-pentamethyl-4-piperidyl)sebacate; however, are not limited thereto. Specific examples of commercially available products of the ultraviolet absorber include ADK STAB (registered trademark) LA-52, LA-57, LA-63P, LA-68, LA-72, LA-77Y, and LA-77G manufactured by ADEKA Corporation, and JF-90 and JF-95 manufactured by Johoku Chemical Co., Ltd.; however, are not limited thereto.

<Flow Starting Temperature>

For the sheet-shaped photocurable composition according to the present invention, a temperature at which tan δ=1 before curing is preferably 60 to 120° C. When the temperature is within the above range, it becomes easier to process the photocurable composition into a film form, and bonding by lamination at room temperature is facilitated. The temperature of tan δ=1 can be measured by a rheometer. The tan δ is calculated from the storage modulus (G') and the loss modulus (G"), there is a relationship of tan δ=G"/G', and "tan δ=1" means a temperature at a boundary between a solid and a liquid.

<Storage Modulus>

In addition, for the sheet-shaped photocurable composition according to the present invention, the storage modulus after curing at 25° C. is preferably $0.1 \times 10^7$ to $10.0 \times 10^7$ Pa, and more preferably $0.1 \times 10^7$ to $5.0 \times 10^7$ Pa. The storage modulus can be measured at each frequency by DMA (dynamic viscoelasticity measurement). An example thereof includes a numerical value at a frequency of 1 Hz.

[Photocurable Composition Solution]

In the present invention, a solvent can also be used for processing the photocurable composition in a state before being cured by light irradiation (uncured state) into a sheet shape, and for mixing the respective components included in the sheet-shaped photocurable composition. That is, another aspect of the present invention is a photocurable composition solution including the following components (A) to (D) and a solvent:

component (A): (meth)acrylic triblock copolymer;
component (B): (meth)acrylate oligomer (excluding the component (A));
component (C): compound represented by the above formula 1; and
component (D): photoinitiator.

<Solvent>

Examples of the solvent include alcohols such as methanol and ethanol; chlorine-based solvents such as dichloroethane and trichloroethane; fluorine-based solvents such as trichlorofluoroethane; ketone-based solvents such as acetone, methyl ethyl ketone, and methyl isobutyl ketone; ester solvents such as methyl acetate, ethyl acetate, propyl acetate, and butyl acetate; ethers such as dimethyl ether and methyl ethyl ether; hydrocarbon-based solvents such as pentane, hexane, heptane, and cyclohexane; and aromatic solvents such as benzene, toluene, and xylene. Of these, a ketone-based solvent is preferable in consideration of compatibility with the component (A) to the component (C).

The content of the solvent included in the photocurable composition solution is not particularly limited, and is preferably 30 to 200 parts by mass, and more preferably 50 to 100 parts by mass relative to 100 parts by mass of the total mass of the components (A) to (D). Within this range, when the photocurable composition is molded into a sheet shape, it is easier to achieve a film thickness of 300 µm or less, or even 200 µm or less.

[Method for Producing Photocurable Composition Solution/Sheet-Shaped Photocurable Composition]

<Method for Producing Photocurable Composition Solution>

The method for producing a photocurable composition solution according to the present invention is not particularly limited, and the photocurable composition solution can be obtained by mixing the above components and a solvent by a known mixing method. The order of addition of the components is not particularly limited, and it is preferable that the component (A) and the solvent are first added to a stirred vessel and stirred, and then other components are added and stirred. If the solvent is volatilized during mixing, it is preferable to add the volatilized amount of solvent. The production conditions are not particularly limited, and the production under light-shielding conditions is preferably performed for the purpose of suppressing an increase in viscosity. In addition, the mixing conditions are not particularly limited, and the mixing temperature is preferably 10 to 70° C., more preferably 20 to 50° C., and particularly preferably normal temperature (25° C.), and the mixing time (total time in the case of two stages) is preferably 0.1 to 5 hours, and more preferably 30 minutes to 3 hours.

<Method for Producing Sheet-Shaped Photocurable Composition>

As a method for processing the photocurable composition into a sheet shape (method for producing a sheet-shaped photocurable composition), a known technique can be used. Examples thereof include a method of preparing a stock solution (photocurable composition solution) in which the viscosity is intentionally lowered by adding a solvent to all components included in the photocurable composition, applying the stock solution (applying step) to a release paper or a release film (hereinafter, also referred to as "release film or the like") whose surface has been previously subjected to a release treatment, and then drying the solvent (drying step) to process the photocurable composition into a sheet shape. Thus, a photocurable composition that is in a sheet shape at 25° C. in a state before curing is obtained. That is, still another aspect of the present invention is a method for producing a photocurable composition that is in a sheet shape at 25° C. in a state before curing, the method including volatilizing a solvent included in the photocurable composition solution. Then, it is preferable to volatilize the solvent on the release paper or the release film.

As the applying step, a known applying method can be used, and specific examples thereof include a flow coating method, a roll coating method, a gravure roll method, a wire bar method, and a lip die coating method; however, are not limited thereto. The thickness (film thickness) of the stock solution (photocurable composition solution) during applying is not particularly limited, and is preferably 50 to 300 μm.

In addition, as the drying step, a known drying method can be used. The drying device used in this case is not particularly limited, and examples thereof include a hot air drying furnace and an IR furnace. In addition, a conveyor for conveying the release film or the like applied with the stock solution may be provided in the hot air drying furnace.

The temperature of the drying step is not particularly limited as long as the solvent included in the stock solution is sufficiently volatilized, and for example, the temperature is preferably 40 to 150° C., and more preferably 60 to 120° C. In addition, the drying time is not particularly limited, and is preferably, for example, 1 to 20 minutes, and more preferably 3 to 10 minutes. Furthermore, the drying step may be performed in multiple stages by changing the drying temperature.

The sheet-shaped photocurable composition thus formed has a configuration formed on a release film or the like as described above (a configuration in which a release film or the like is attached to one surface of the sheet-shaped photocurable composition). In addition, for the sheet-shaped photocurable composition, a release film or the like may be attached to both surfaces. Furthermore, when a release film or the like is not used during the applying, or when a release film or the like other than that used during applying is used, a release film or the like may be separately attached to one surface or both surfaces of the sheet-shaped photocurable composition.

The release paper is not particularly limited, and examples thereof include paper obtained by providing an coating layer composed of a blocking agent such as clay, polyethylene, or polypropylene on at least one side of paper such as high-quality paper, kraft paper, or glassine paper, and applying a silicone-based, fluorine-based, or alkyd-based release agent on the coating layer.

Examples of the material of the release film include: plastic films such as polyethylene, polypropylene, polyethylene terephthalate, and polyester films; fabrics; and non-woven fabrics. Of these, a plastic film is preferable from the viewpoint of releasability. The thickness of the release film is preferably 5 to 300 μm, and more preferably 25 to 200 μm. In addition, the release film is preferably subjected to a release treatment with a fluorine-based compound, a silicone-based compound, a long-chain alkyl-based compound, or the like.

[Cured Product and Method for Producing the Same]

The sheet-shaped photocurable composition according to the present invention can be cured by irradiation with light (active energy rays such as ultraviolet rays and visible rays). That is, still another aspect of the present invention is a cured product obtained by curing the sheet-shaped photocurable composition. The light herein means light in a broad sense including radiation such as α rays and β rays, electromagnetic waves such as γ rays and X rays, an electron beam (EB), and irradiation light having a wavelength of 150 to 750 nm. Of these, the irradiation light is preferably in a wavelength range of 150 to 750 nm, and is preferably ultraviolet rays having a wavelength of about 150 to 400 nm or visible rays having a wavelength of about 400 to 750 nm.

The light source used for curing the sheet-shaped photocurable composition is not particularly limited, and examples thereof include a low-pressure mercury lamp, an intermediate-pressure mercury lamp, a high-pressure mercury lamp, an ultra-high-pressure mercury lamp, a xenon lamp, a metal halide lamp, and an LED lamp. As an apparatus for curing the sheet-shaped photocurable composition according to the present invention by light irradiation (active energy ray irradiation), an irradiation apparatus having the light source described above (a high-pressure mercury lamp, an LED lamp, or the like) can be used. Specific examples of the apparatus include a belt conveyor type irradiator and a spot irradiator; however, are not limited thereto.

The range of the integrated light amount is not particularly limited, and curing is performed with the above light source at an integrated light amount of preferably 1 to 100 kJ/m$^2$, more preferably 5 to 70 kJ/m$^2$, and particularly preferably 10 to 50 kJ/m$^2$.

[Laminated Body]

As described above, a solvent is added to all components included in the sheet-shaped photocurable composition according to the present invention to prepare a photocurable composition solution (stock solution), the stock solution is applied to an adherend, and then the solvent is volatilized (sublimated), thereby enabling formation of a laminated body of the photocurable composition that is in a sheet shape at 25° C. and the adherend. That is, still another aspect of the present invention is a laminated body having a configuration in which a first adherend, a sheet-shaped photocurable composition, and a second adherend are bonded (laminated) in this order, wherein the sheet-shaped photocurable composition is formed by volatilizing the solvent included in the photocurable composition solution on the first adherend and/or the second adherend.

A preferable embodiment of the method for producing the laminated body includes a method in which a photocurable composition solution (stock solution) is applied onto a first adherend (or a second adherend), then a solvent included in the stock solution is volatilized (dried) to form a sheet-shaped photocurable composition, and then the second adherend (or the first adherend) is laminated on the sheet-shaped photocurable composition.

Furthermore, by irradiating the sheet-shaped photocurable composition included in the laminated body (the laminated body having a configuration in which the first adherend, a sheet-shaped photocurable composition, and the second adherend are laminated in this order) thus obtained with an active energy ray to cure the composition, the first adherend and the second adherend can be bonded to each other. Therefore, still another aspect of the present invention is an bonding method including the steps of: applying a photocurable composition solution (stock solution) onto the first adherend; volatilizing (drying) a solvent included in the stock solution to form a sheet-shaped photocurable composition; laminating the second adherend on the sheet-shaped photocurable composition; and irradiating the sheet-shaped photocurable composition with an active energy ray to cure the sheet-shaped photocurable composition. The drying conditions and curing conditions in this case are not particularly limited, and are the same as the drying conditions described in the section of <Method for Producing Sheet-Shaped Photocurable Composition> and the curing conditions described in the section of [Cured Product and Method for Producing the Same], respectively.

In addition, as described above, the sheet-shaped photocurable composition according to the present invention is obtained by volatilizing the solvent included in the photocurable composition solution on a release film or the like in a preferable embodiment, and has a configuration in which the release film or the like is attached to one surface of the sheet-shaped photocurable composition.

Therefore, another preferable embodiment of the method for bonding the first adherend and the second adherend (bonding method) includes a method including a step (bonding step) of bonding two transparent adherends by using a sheet-shaped photocurable composition to which a release film or the like is attached on one surface. The bonding step preferably includes a laminating step and a curing step.

In the laminating step, the surface (exposed surface) of the sheet-shaped photocurable composition to which the release film is not attached is attached (in close contact with) to the one adherend (the first adherend) and during this state, bonding is preferably performed while pressure and heat are provided by using a laminator. Thereafter, the release film is peeled off, and the other adherend (the second adherend) is similarly bonded by a laminator Herein, the lamination pressure is not particularly limited, and is preferably, for example, 0.1 to 3 MPa. In addition, the lamination temperature is not particularly limited, and is preferably, for example, 15 to 100° C.

As apparatus used for bonding, a vacuum press machine, a vacuum laminator, an autoclave, or the like, which enables bonding in vacuum or under a reduced pressure atmosphere, may be used instead of the laminator As the curing step, the laminated body after lamination (laminated body composed of the first adherend, the sheet-shaped photocurable composition, and the second adherend) is irradiated with an active energy ray to cure the sheet-shaped photocurable composition, thereby allowing two adherends to be bonded. The curing conditions in this case are not particularly limited, and are the same as the conditions described in the section of [Cured Product and Method for Producing the Same].

[Application]

The sheet-shaped photocurable composition according to the present invention can be used for assembly of a display device such as a liquid crystal display or an organic EL display. Specifically, it is suitable for assembling a display element, a cover panel, a touch panel, or the like into a display device, or for assembling an organic EL element itself.

The embodiments of the present invention have been described in detail, this is illustrative and exemplary and not restrictive, and it is clear that the scope of the present invention should be interpreted by the appended The present invention includes the following aspects and embodiments.

1. A sheet-shaped photocurable composition including components (A) to (D) as follows and being in a sheet shape at 25° C. in a state before curing, Component (A): (meth)acrylic triblock copolymer Component (B): (meth)acrylate oligomer (excluding component (A))

Component (C): compound represented by the following formula 1

[Formula 1]

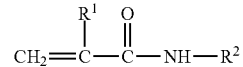

(In the above formula 1, $R^1$ is a hydrogen atom or a methyl group, and $R^2$ is a monovalent organic group including an oxygen atom)

Component (D): photoinitiator.

2. The sheet-shaped photocurable composition according to 1 described above, including 0.1 to 10 parts by mass of the component (C) relative to 100 parts by mass of the component (A).

3. The sheet-shaped photocurable composition according to 1 or 2 described above, including 10 to 80 parts by mass of the component (B) relative to 100 parts by mass of the component (A).

4. The sheet-shaped photocurable composition according to any one of 1 to 3 described above, wherein in the formula 1, $R^1$ is a hydrogen atom, and $R^2$ includes a hydroxyl group and/or an ether bond.

5. The sheet-shaped photocurable composition according to any one of 1 to 4 described above, wherein the component (B) is a urethane-modified (meth)acrylate oligomer.

6. The sheet-shaped photocurable composition according to any one of 1 to 5 described above, further including a coupling agent as the component (E).

7. A photocurable composition solution including components (A) to (D) as follows and a solvent:

Component (A): (meth)acrylic triblock copolymer;

Component (B): (meth)acrylate oligomer (excluding the component (A));

Component (C): compound represented by the formula 1; and

Component (D): photoinitiator.

8. A method for producing a photocurable composition that is a sheet shape at 25° C. in a state before curing, the method including volatilizing the solvent included in the photocurable composition solution set forth in 7 described above.

9. The method for producing the sheet-shaped photocurable composition according to 8 described above, wherein volatilization of the solvent is performed on a release paper or a release film.

10. A laminated body, including a configuration in which a first adherend, a sheet-shaped photocurable composition, and a second adherend are bonded in this order, wherein the sheet-shaped photocurable composition is formed by volatilizing a solvent included in the photocurable composition solution set forth in 7 described above on the first adherend and/or the second adherend.

EXAMPLES

Hereinafter, the present invention will be described in more detail with reference to examples; however, the present invention is not limited only to these examples. Hereinafter, the photocurable composition including a solvent (that is, the photocurable composition solution) may also be simply referred to as a "stock solution". In addition, a photocurable composition that is in a sheet shape at 25° C. in a state before curing, obtained by volatilizing a solvent from the "stock solution", may be simply referred to as a "sheet-shaped composition". Operation, test, and the like were performed under an environment of 25° C. and 55% RH unless otherwise specified.

<Preparation of Photocurable Composition Solution (Stock Solution)>

Examples 1 to 13 and Comparative Examples 1 to 11

(1) In order to prepare a stock solution, the following components were prepared.

<<Component (A): (Meth)Acrylic Triblock Copolymer>>
  (Meth)acrylic triblock copolymer (PMMA-PnBA-PMMA triblock copolymer including about 40% by mass of PMMA (polymethyl methacrylate: glass transition temperature 105° C.) and about 60% by mass of PnBA (poly n-butyl acrylate: glass transition temperature −54° C.)) (tensile elongation: 149%) (KURARITY (registered trademark, the same applies hereinafter) LA2270 manufactured by KURARAY CO., LTD.)
  (Meth)acrylic triblock copolymer (PMMA-PnBA-PMMA triblock copolymer whose weight average molecular weight is about 60,000, including about 30% by mass of PMMA and about 70% by mass of PnBA) (tensile elongation: 380%) (KURARITY LA2250 manufactured by KURARAY CO., LTD.)
  (Meth)acrylic triblock copolymer (PMMA-PnBA-PMMA triblock copolymer including about 20% by mass of PMMA and about 80% by mass of PnBA) (tensile elongation: 570%) (KURARITY LA2140 manufactured by KURARAY CO., LTD.)
  (Meth)acrylic triblock copolymer (PMMA-PnBA-PMMA triblock copolymer whose weight average molecular weight is about 110,000, including about 20% by mass of PMMA and about 80% by mass of PnBA) (tensile elongation: 490%) (KURARITY LA2330 manufactured by KURARAY CO., LTD.)
  (Meth)acrylic triblock copolymer (PMMA-PnBA-PMMA triblock copolymer including about 15% by mass of PMMA and about 85% by mass of PnBA) (tensile elongation: 540%) (KURARITY LA3320 manufactured by KURARAY CO., LTD.)
  The value of the tensile elongation of the component (A) is a value measured in accordance with ISO37: 2017.

<<Component (B): (Meth)Acrylate Oligomer>>
  Aliphatic urethane-modified diacrylate (number of functional groups: 2, weight average molecular weight (Mw): 5,000, glass transition temperature: −55° C.) (EBECRYL (registered trademark) 230 manufactured by Daicel-Allnex Ltd.)

<<Component (C): (Meth)Acrylate Monomer Represented by Formula 1>>
  HEAA (hydroxyethyl acrylamide) (HEAA (registered trademark) manufactured by KJ Chemicals Corporation)
  NBMA (N-n-butoxymethylaciylamide) (manufactured by Shimyo Corporation)

<<Component (C'): Monomer Other than Component (C)>>
  Ethoxylated (9)trimethylolpropane triacrylate (SR502 manufactured by Sartomer Corporation)
  Polyethylene glycol #600 dimethacrylate (NK Ester 14G manufactured by Shin-Nakamura Chemical Co., Ltd.)
  2-Hydroxyethyl methacrylate acid phosphate (JPA-514 manufactured by Johoku Chemical Co., Ltd.)
  Mono(2-hydroxyethyl methacrylate)phosphate (JAMP-514 manufactured by Johoku Chemical Co., Ltd.)
  Dimethylacrylamide (DMAA (registered trademark) manufactured by KJ Chemicals Corporation)
  Acryloyl morpholine (ACMO (registered trademark) manufactured by KJ Chemicals Corporation)
  Dimethylaminopropyl acrylamide (DMAPAA (registered trademark) manufactured by KJ Chemicals Corporation)
  Diethylacrylamide (DEAA (registered trademark) manufactured by KJ Chemicals Corporation)

<<Component (D): Photoinitiator>>
  2,4,6-Trimethylbenzoyl-diphenyl-phosphine oxide (OMNIRAD (registered trademark) TPO manufactured by IGM Resins B.V. corporation)

<<Component (E): Coupling Agent>>
  3-Methacryloyloxypropyltrimethoxysilane (KBM-503 manufactured by Shin-Etsu Chemical Co., Ltd.)

<<Solvent>>
  Methyl ethyl ketone (reagent)

(2) All components were stirred and mixed by the following operations to provide a stock solution.

The component (A) and a solvent (methyl ethyl ketone) were weighed, and stirred in a stirred vessel under an atmosphere of 25° C. for 1 hour. When the solvent was volatilized from the total weight before stirring, the volatilized amount of the solvent was supplemented. Thereafter, the component (B), the component (C) (or the component (C')), the component (D), and the component (E) were weighed, added to the stirred vessel, and stirred for 30 minutes while being shielded from light. The content (preparation amount) of each component in each stock solution is shown in Table 1. All numerical values in Table 1 are described in units of parts by mass. In addition, the blank indicates that the corresponding component is not added.

TABLE 1

| Component | Raw material | Example 1 | Example 2 | Example 3 | Example 4 | Example 5 | Example 6 | Example 7 | Example 8 |
|---|---|---|---|---|---|---|---|---|---|
| Component (A) | LA2270 | 100.0 | 100.0 | 100.0 | | | | | |
| | LA2250 | | | | 100.0 | | | | |
| | LA2140 | | | | | 100.0 | 100.0 | | |
| | LA2330 | | | | | | | 100.0 | |
| | LA3320 | | | | | | | | 100.0 |

TABLE 1-continued

| Component | Raw material | | | | | | | | |
|---|---|---|---|---|---|---|---|---|---|
| Component (B) | EBECRYL230 | 42.9 | 42.9 | 42.9 | 42.9 | 42.9 | 42.9 | 42.9 | 42.9 |
| Component (C) | HEAA | 7.1 | 4.3 | | 4.3 | 4.3 | 4.3 | 4.3 | 4.3 |
| | NBMA | | | 4.3 | | | | | |
| Component (C') | SR502 | 14.3 | | | | | | | |
| | 14G | 4.3 | | | | | | | |
| | JPA-514 | | | | | | | | |
| | JAMP-514 | | | | | | | | |
| | DMAA | | | | | | | | |
| | ACMO | | | | | | | | |
| | DMAPAA | | | | | | | | |
| | DEAA | | | | | | | | |
| Component (D) | TPO | 0.9 | 0.9 | 0.9 | 0.9 | 0.9 | 0.9 | 0.9 | 0.9 |
| Component (E) | KBM-503 | 4.3 | 4.3 | 4.3 | 4.3 | 4.3 | 1.4 | 1.4 | 1.4 |
| Solvent | Methyl ethyl ketone | 100.0 | 100.0 | 100.0 | 100.0 | 100.0 | 100.0 | 100.0 | 100.0 |
| | Total | 273.7 | 252.3 | 252.3 | 252.3 | 252.3 | 249.4 | 249.4 | 249.4 |

| Component | Raw material | Example 9 | Example 10 | Example 11 | Example 12 | Example 13 | Comparative Example 1 | Comparative Example 2 | Comparative Example 3 |
|---|---|---|---|---|---|---|---|---|---|
| Component (A) | LA2270 | | | | | | 100.0 | | |
| | LA2250 | | | | | | | 100.0 | |
| | LA2140 | | | | | | | | 100.0 |
| | LA2330 | | | | | | | | |
| | LA3320 | 100.0 | 100.0 | 100.0 | 100.0 | 100.0 | | | |
| Component (B) | EBECRYL230 | 42.9 | 42.9 | 42.9 | 42.9 | 42.9 | 42.9 | 42.9 | 42.9 |
| Component (C) | HEAA | 4.3 | 5.7 | 7.1 | 7.1 | 7.1 | | | |
| | NBMA | | | | | | | | |
| Component (C') | SR502 | | | | | | | | |
| | 14G | | | | | 1.4 | | | |
| | JPA-514 | | | | | | | | |
| | JAMP-514 | | | | | | | | |
| | DMAA | | | | | | | | |
| | ACMO | | | | | | | | |
| | DMAPAA | | | | | | | | |
| | DEAA | | | | | | | | |
| Component (D) | TPO | 0.9 | 0.9 | 0.9 | 0.9 | 0.9 | 0.9 | 0.9 | 0.9 |
| Component (E) | KBM-503 | | | | 1.4 | 1.4 | 4.3 | 4.3 | 4.3 |
| Solvent | Methyl ethyl ketone | 100.0 | 100.0 | 100.0 | 100.0 | 100.0 | 100.0 | 100.0 | 100.0 |
| | Total | 248.0 | 249.4 | 250.9 | 252.3 | 253.7 | 248.0 | 248.0 | 248.0 |

| Component | Raw material | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|
| Component (A) | LA2270 | | 100.0 | 100.0 | 100.0 | 100.0 | 100.0 | 100.0 | 100.0 |
| | LA2250 | | | | | | | | |
| | LA2140 | | | | | | | | |
| | LA2330 | 100.0 | | | | | | | |
| | LA3320 | | | | | | | | |
| Component (B) | EBECRYL230 | 42.9 | 42.9 | 42.9 | 42.9 | 42.9 | 42.9 | 42.9 | 42.9 |
| Component (C) | HEAA | | | | | | | | |
| | NBMA | | | | | | | | |
| Component (C') | SR502 | | 14.3 | 14.3 | 14.3 | 14.3 | 14.3 | 14.3 | 14.3 |
| | 14G | | 4.3 | 4.3 | 4.3 | 4.3 | 4.3 | 4.3 | 4.3 |
| | JPA-514 | | | 7.1 | | | | | |
| | JAMP-514 | | | | 7.1 | | | | |
| | DMAA | | | | | 7.1 | | | |
| | ACMO | | | | | | 7.1 | | |
| | DMAPAA | | | | | | | 7.1 | |
| | DEAA | | | | | | | | 7.1 |
| Component (D) | TPO | 0.9 | 0.9 | 0.9 | 0.9 | 0.9 | 0.9 | 0.9 | 0.9 |
| Component (E) | KBM-503 | 4.3 | 4.3 | 4.3 | 4.3 | 4.3 | 4.3 | 4.3 | 4.3 |
| Solvent | Methyl ethyl ketone | 100.0 | 100.0 | 100.0 | 100.0 | 100.0 | 100.0 | 100.0 | 100.0 |
| | Total | 248.0 | 266.6 | 273.7 | 273.7 | 273.7 | 273.7 | 273.7 | 273.7 |

<Evaluation>

A sheet-shaped composition was prepared by using each of the stock solutions of examples 1 to 13 and comparative examples 1 to 11 by the following production method. Using the sheet-shaped composition, rheometer measurement (before curing), peel adhesive strength measurement (after curing), white turbidity (haze) measurement (after curing), and dynamic viscoelasticity measurement (DMA) (after curing) were performed. For each sheet-shaped composition, the results obtained from these evaluations (tests) are shown in Table 2 below. In Table 2, the numbers of the stock solutions described in Table 1 are directly reflected for the numbers of the respective sheet-shaped compositions.

[Method for Producing Sheet-Shaped Composition]

Each of the stock solutions of examples 1 to 13 and comparative examples 1 to 11 was applied onto a release film with a clearance of 200 μm by an applying machine. Subsequently, the stock solution was dried by sequentially passing through a drying line having a length of 1.5 m in an atmosphere at 80° C. and a drying line having a length of 1.5 m in an atmosphere at 100° C. at a speed of 500 mm/min to form a sheet shape. By such an operation, a sheet-shaped composition was obtained.

Thereafter, a release film different from the above was attached to produce a sheet provided with two types of release films. For each of the sheets thus obtained, the film thickness including two types of release films was measured with a thickness gauge, the thickness of the sheet (after drying) was obtained by subtracting the thicknesses of the two types of release films, and the film thickness was 100 μm for all of the sheets. In the drying for volatilizing the solvent, the solvent is dried from the surface of the stock solution, and the solvent inside is hardly volatilized. Therefore, if the film thickness is increased, air bubbles may remain in the applied film, and thus the clearance during applying is preferably 300 μm or less (lower limit: more than 0 μm).

[Rheometer Measurement (Before Curing)]

The sheet-shaped composition obtained by the above procedure was peeled off from the release film, 7 sheets were stacked so that the total thickness was 700 μm, and degassed by using a vacuum laminator Using HAAKE MARSIII manufactured by Thermo Fisher Scientific Inc., viscoelasticity measurements were performed in a temperature range of 0 to 130° C. The temperature at which tan δ=1 was obtained was defined as the "flow starting temperature (° C.)", and the value thereof is shown in Table 2. In the present invention, it can be said that lamination at normal temperature is possible when the flow starting temperature is 60 to 120° C.

[Measurement of Peel Adhesive Strength (after Curing)]

COSMOSHINE (registered trademark) A4300 (PET film) having a length of 100 mm×a width of 25 mm×a thickness of 50 μm manufactured by Toyobo Film Solutions Limited and an acrylic resin plate having a length of 100 mm×a width of 25 mm×a thickness of 2 mm manufactured by Asahi Bietechno Co., Ltd. were combined to prepare a test piece, and the 180 degree peel adhesive strength was measured in accordance with JIS K 6854-2: 1999. Preparation conditions of the test piece were as follows. A PET film was passed through a thermal roll laminator at a roll temperature of 25° C. and a pressure of 0.2 MPa in a state that a sheet-shaped composition having a release film attached to a surface on a side opposite to the PET film side was stacked in a region of 70 mm in length×25 mm in width, and then the release film was peeled off, an acrylic resin plate was stacked, and the PET film with the sheet-shaped composition was passed again under the same conditions. Thereafter, the PET film (the test piece) was placed in an autoclave at a pressure of 0.5 MPa under an atmosphere of 70° C. for 20 minutes. After confirming that the temperature of the test piece had decreased to room temperature, the sheet-shaped composition was irradiated with ultraviolet rays (light source: high-pressure mercury lamp) using a belt conveyor type ultraviolet ray irradiator such that the integrated light amount was 30 kJ/m$^2$, and the sheet-shaped composition was thus cured. The strength was measured by pulling at a speed of 60 mm/min with a precision universal testing machine (Autograph AGX-V series) manufactured by Shimadzu Corporation, and the average value was taken as the "peel adhesive strength (kN/m)". The peel adhesive strength at 25° C. and 85° C. is referred to as "peel adhesive strength 1" and "peel adhesive strength 2", respectively, and the values are shown in Table 2. The "peel adhesive strength 1" is preferably 1.0 kN/m or more, and the "peel adhesive strength 2" is preferably 0.3 kN/m or more. Whereas, the upper limit thereof is not particularly limited, and the peel adhesive strength 1 is preferably 3.0 kN/m or less, and the peel adhesive strength 2 is preferably 2.0 kN/m or less. The peel adhesive strength at 85° C. was measured as follows. The thermostatic chamber attached to the precision universal testing machine was set to 85° C.; the thermostatic chamber was slid from the rear side of the precision universal testing machine; and was installed so that the thermostatic chamber entirely covered the chuck and the test piece (the test piece sandwiched between the upper and lower chucks). Thereafter, the chuck and the test piece were held in the thermostatic chamber for 10 minutes, and then the strength was measured as described above.

[White Turbidity (Haze) Measurement (after Curing)]

The sheet-shaped composition from which one release film was peeled off was brought into close contact with an alkali-free glass plate having a thickness of 0.7 mm×a width of 100 mm×a length of 100 mm, and transfer was performed by using a thermal roll laminator with the roll temperature set to 25° C. Thereafter, the other release film was peeled off, and the same alkali-free glass plate as described above was attached. Thereafter, the test piece was placed in a diaphragm type vacuum laminator, degassed for 120 seconds, and pressurized at a pressure of 0.1 MPa for 180 seconds with setting the flow starting temperature of each sheet-shaped composition. Finally, an ultraviolet ray (light source: high-pressure mercury lamp) was irradiated using a belt conveyor type ultraviolet ray irradiator such that the integrated light amount was 30 kJ/m$^2$, to prepare a test piece in which two pieces alkali-free glass was bonded by the cured product of the sheet-shaped composition. The test piece was subjected to white turbidity (haze) measurement as follows by using a spectroscopic haze meter SH7000 manufactured by Nippon Denshoku Industries Co., Ltd. The light transmittance at a wavelength in the range of 780 nm to 380 nm was measured, and the white turbidity was calculated in accordance with JIS K 7136: 2000. The number of tests was n=3, and the average value was calculated. The results are shown in Table 2 as "white turbidity (unitless)". In the case of use for optical applications, the white turbidity is preferably 0.50 or less, and more preferably 0.30 or less. Whereas, the lower limit is not particularly limited, and is about 0.01.

[Dynamic Viscoelasticity Measurement (DMA) (after Curing)]

A sheet-shaped composition having a length of 60 mm×a width of 10 mm×a thickness of 0.7 mm was irradiated with ultraviolet rays (light source: high-pressure mercury lamp) using a belt conveyor type ultraviolet ray irradiator such that the integrated light amount was 30 kJ/m² to prepare a cured product. Measurement was performed in a temperature range of −50 to 100° C. at a frequency of 1 Hz using a dynamic viscoelasticity measuring device DMS6100 manufactured by Hitachi High-Tech Science Corporation. The "storage modulus (×10⁻⁷ Pa)" at a frequency of 1 Hz and 25° C. was confirmed, and the value was shown in Table 2. In Table 2, the results are given in units of "×10⁷ Pa". The storage modulus is preferably 0.1×10⁷ to 10.0×10⁷ Pa.

TABLE 2

| Test item | Example 1 | Example 2 | Example 3 | Example 4 | Example 5 | Example 6 | Example 7 | Example 8 |
|---|---|---|---|---|---|---|---|---|
| Flow starting temperature | 80 | 116 | 116 | 79 | 65 | 73 | 107 | 97 |
| Peel adhesive strength 1 | 1.24 | 1.14 | 1.00 | 1.30 | 1.11 | 1.10 | 1.00 | 1.00 |
| Peel adhesive strength 2 | 0.61 | 0.49 | 0.38 | 0.55 | 0.39 | 0.70 | 0.70 | 0.50 |
| White turbidity | 0.05 | 0.05 | 0.05 | 0.05 | 0.05 | 0.05 | 0.05 | 0.05 |
| Storage modulus | 4.6 | 2.6 | 1.7 | 1.3 | 0.7 | 0.5 | 0.5 | 0.2 |

| Test item | Example 9 | Example 10 | Example 11 | Example 12 | Example 13 | Comparative Example 1 | Comparative Example 2 | Comparative Example 3 |
|---|---|---|---|---|---|---|---|---|
| Flow starting temperature | 93 | 89 | 74 | 86 | 77 | 120 | 92 | 84 |
| Peel adhesive strength 1 | 1.13 | 1.14 | 1.24 | 1.27 | 1.38 | 0.97 | 0.90 | 0.88 |
| Peel adhesive strength 2 | 0.58 | 0.68 | 0.70 | 0.68 | 0.84 | 0.40 | 0.54 | 0.35 |
| White turbidity | 0.05 | 0.05 | 0.05 | 0.05 | 0.05 | 0.05 | 0.05 | 0.05 |
| Storage modulus | 0.2 | 0.4 | 0.4 | 0.4 | 0.4 | 1.5 | 0.7 | 0.3 |

| Test item | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|
| Flow starting temperature | 104 | 78 | 80 | 80 | 80 | 80 | 80 | 80 |
| Peel adhesive strength 1 | 0.37 | 0.57 | 0.54 | 0.51 | 0.57 | 0.61 | 0.54 | 0.61 |
| Peel adhesive strength 2 | 0.14 | 0.46 | 0.41 | 0.38 | 0.44 | 0.50 | 0.42 | 0.49 |
| White turbidity | 0.05 | 0.05 | 0.05 | 0.05 | 0.05 | 0.05 | 0.05 | 0.05 |
| Storage modulus | 0.3 | 3.2 | 3.2 | 3.2 | 3.2 | 3.2 | 3.2 | 3.2 |

In a test for measuring peel adhesive strength by using a PET film as an adherend (substrate), which is typically less likely to be improved in peel adhesive strength, examples 1 to 13 exhibited high peel adhesive strength of 1.0 kN/m or more under an atmosphere at 25° C. and 0.3 kN/m or more under an atmosphere at 85° C. Although there is no clear reason, it is presumed that by using the compound represented by the formula 1 as the component (C), the sheet-shaped composition has moderately high affinity with the surface of the PET film, and high peel adhesive strength is obtained. In addition, for example, in comparative examples 2 to 4, the storage modulus of the cured product was able to be lowered; however, in the case of the composition not including the component (C) in the present invention, peel adhesive strength 1 is small, and it is considered that peeling occurs at the interface between the cured product and the adherend. Furthermore, it can be seen from examples and comparative examples that the flow starting temperature changes depending on the type of the component (A), and it is thus considered that when performing the bonding operation, the white turbidity can be suppressed to a low level by performing the bonding operation with setting the temperature to be the flow starting temperature of each sheet-shaped composition.

The present invention can be used for assembly of a display device such as a liquid crystal display or an organic EL display. Specifically, the present invention is suitable for assembling a display element, a cover panel, a touch panel, VR goggles, or the like as a display device or assembling an organic EL element itself, and can be applied even if the surface of the adherend is curved instead of flat.

What is claimed is:

1. A sheet-shaped photocurable composition comprising components (A) to (D) as follows and being in a sheet shape at 25° C. in a state before curing:

Component (A): (meth)acrylic triblock copolymer,
   Component (B): (meth)acrylate oligomer (excluding the component (A)),
   Component (C): at least one compound selected from the group consisting of hydroxyethyl (meth) acrylamide and N-n-butoxymethyl (meth) acrylamide, and
   Component (D): photoinitiator,
   wherein a content of the component (B) is 42.9 to 66.7 parts by mass relative to 100 parts by mass of the component (A),
   a content of the component (C) is 4.3 to 7.1 parts by mass relative to 100 parts by mass of the component (A),
   the component (A) is an elastomer including no reactive functional group and is a triblock copolymer of (meth) acrylate of an X—Y—X type composed of a segment X and a segment Y, in which the segment X is a polymethyl methacrylate block and the segment Y is a poly-n-butyl acrylate block, and
   the component (B) is an aliphatic urethane-modified diacrylate oligomer which has a weight average molecular weight of 4,000 to 30,000.

2. The sheet-shaped photocurable composition according to claim 1, further comprising a coupling agent as a component (E).

3. The sheet-shaped photocurable composition according to claim 1, wherein a cured product of the sheet-shaped photocurable composition has a peel adhesion strength at 25° C. of 1.0 kN/m or more and a peel adhesion strength at 85° C. of 0.3 kN/m or more.

4. The sheet-shaped photocurable composition according to claim 1, wherein a content of the component (A) is 40 to 90 parts by mass relative to 100 parts by mass of a total of the components (A) to (D).

5. A laminated body, comprising a configuration in which a first adherend, a sheet-shaped photocurable composition, and a second adherend are bonded in this order, wherein
the sheet-shaped photocurable composition is formed by volatilizing a solvent included in a photocurable composition solution on the first adherend and/or the second adherend,
the photocurable composition solution comprises components (A) to (D) as follows and the solvent:
Component (A): (meth) acrylic triblock copolymer,
Component (B): (meth)acrylate oligomer (excluding the component (A)),
Component (C): at least one compound selected from the group consisting of hydroxyethyl (meth) acrylamide and N-n-butoxymethyl (meth) acrylamide, and
Component (D): photoinitiator,
a content of the component (B) is 42.9 to 66.7 parts by mass relative to 100 parts by mass of the component (A),
a content of the component (C) is 4.3 to 7.1 parts by mass relative to 100 parts by mass of the component (A),
the component (A) is an elastomer including no reactive functional group, and is a triblock copolymer of (meth) acrylate of an X—Y—X type composed of a segment X and a segment Y, in which the segment X is a polymethyl methacrylate block and the segment Y is a poly-n-butyl acrylate block, and
the component (B) is an aliphatic urethane-modified diacrylate oligomer which has a weight average molecular weight of 4,000 to 30,000.

* * * * *